G. T. RIDINGS.
COMBINED CAMERA SUPPORT AND POSING DEVICE.
APPLICATION FILED DEC. 27, 1912.
1,099,820.
Patented June 9, 1914.
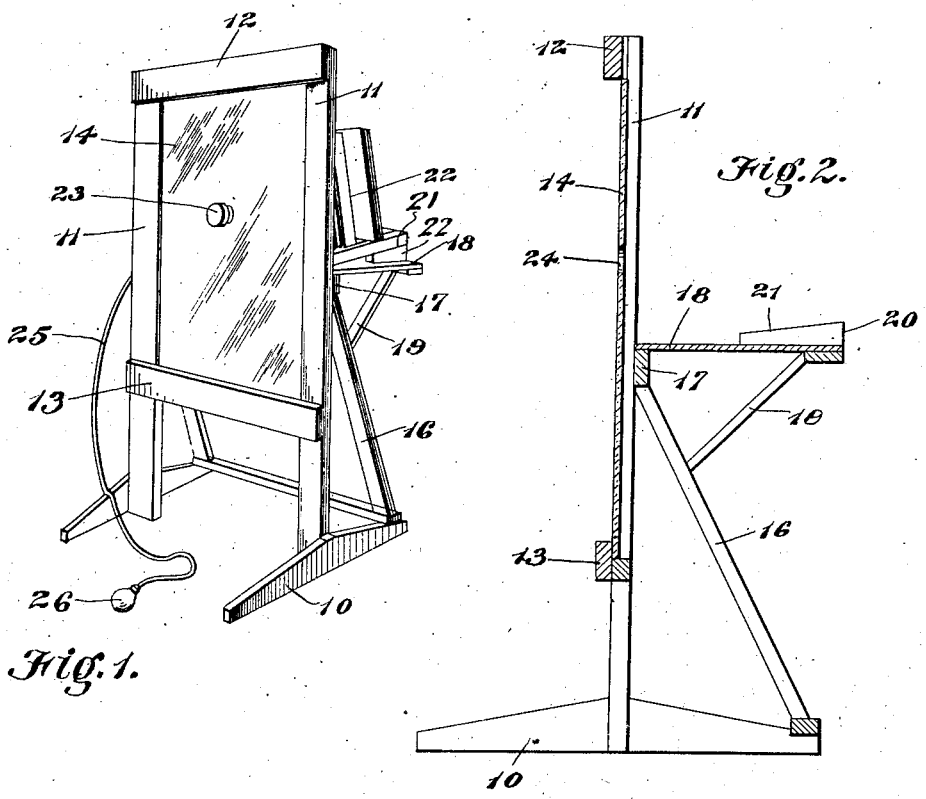
Fig. 1.
Fig. 2.
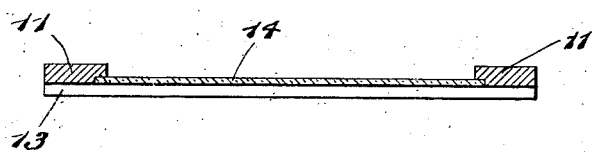
Fig. 3.
Witnesses
Inventor
G. T. Ridings
By Victor J. Evans
Attorney

UNITED STATES PATENT OFFICE.

GEORGE T. RIDINGS, OF GIBBS, MISSOURI.

COMBINED CAMERA-SUPPORT AND POSING DEVICE.

1,099,820.  Specification of Letters Patent.  Patented June 9, 1914.

Application filed December 27, 1912. Serial No. 738,872.

*To all whom it may concern:*

Be it known that I, GEORGE T. RIDINGS, a citizen of the United States, residing at Gibbs, in the county of Adair and State of Missouri, have invented new and useful Improvements in Combined Camera-Supports and Posing Devices, of which the following is a specification.

The invention relates to photography and more particularly to a device for supporting a camera and a posing medium, whereby a person desiring to have his portrait or photograph can adjust himself to the particular pose he desires to have reproduced on the finished portrait.

The invention embodies, among other features, a support adapted to carry a camera with a reflecting medium arranged on the support, with the lens carrier of the camera projecting therethrough so that a person or object stationed in front of the camera will be reflected in the reflecting medium in order that the person can readily adjust himself to the pose he desires.

The invention further embodies a structure whereby the person who is posing himself for the picture can operate the shutter mechanism of the camera to obtain a picture of himself in the pose he desires.

In the further disclosure of the invention reference is to be had to the accompanying drawings, constituting a part of this specification, in which similar characters of reference denote corresponding parts in all the views, and in which:

Figure 1 is a perspective view showing my device in applied position; Fig. 2 is a vertical longitudinal sectional view of the device; and Fig. 3 is a horizontal sectional view showing the manner of supporting the reflecting medium.

Referring more particularly to the views, I disclose a base 10 having a plurality of uprights 11 connected by an upper cross piece 12 and a lower cross piece 13, the inner edges of the said uprights being grooved to slidably receive a mirror or similar reflecting member 14, as shown, the lower cross piece 13 having a longitudinally extending stop member secured to the rear face thereof and against which the lower end of the mirror 14 abuts in order to retain the mirror in position between the uprights 11. Inclined braces 16 extend from the rear end of the base 10 to a point midway between the uprights 11 and are secured thereto, and a supporting board 17 reposes on the upper ends of the braces 16 and is secured to the rear faces of the uprights 11, the said supporting board extending horizontally to the uprights to support the front end of an auxiliary base 18 having the rear end supported by suitable inclined braces 19 secured to the braces 16, thus retaining the auxiliary base 18 in horizontal position in the rear of the mirror 14. Blocks 20 provided with inclined faces 21 are supported on the auxiliary base 18 and a camera 22 is mounted in an inclined position on the said blocks and the said auxiliary base as shown, with the usual lens tube 23 of the camera 22 projecting through an opening 24 formed in substantially the center of the mirror 14. A tube 25 provided with the usual bulb 26 has connection with the shutter operating mechanism of the camera whereby, when the bulb is pressed, the shutter mechanism will be operated in the usual manner, this being the ordinary apparatus generally employed in operating a camera, as will be readily understood. Now referring to Fig. 1 it will be seen that when a person stations himself in front of the mirror 14 he can readily pose himself and assume the position that he desires to be reproduced on the finished picture and when this has been accomplished he can, by pressing the bulb 26, operate the shutter mechanism of the camera and photograph himself. It will be understood, however, that the party stationed in front of the camera can also pose himself without necessarily photographing himself, and that the actual photographing of the party in front of the camera can be performed by the usual operator in charge of the camera.

My device is particularly adaptable for use in photograph galleries and the like where persons desiring to have their photographs taken, can pose themselves in front of the camera and readily adjust themselves to a natural position, thus greatly aiding the photographer in obtaining an efficient photograph of the party desiring the same.

Having thus described my invention, I claim:

In a supporting and posing device for cameras, the combination with a base, of a mirror supported on the base and provided with an opening through which the objective of the camera is adapted to pass, an auxiliary base, a cross piece on the first mentioned base and supporting the inner end of the auxiliary base, braces projecting from the base and connecting with the outer ends of the auxiliary base, whereby the auxiliary base will be supported laterally to the first mentioned base and in the rear of the said mirror, and blocks having inclined faces, said blocks being slidably adjustable on the said auxiliary base and adapted to support the rear end of the camera having its front end reposing on the said auxiliary base.

In testimony whereof I affix my signature in presence of two witnesses.

GEORGE T. RIDINGS.

Witnesses:
  V. J. TOMPKINS,
  W. H. YOUNG.